(12) United States Patent
Liu et al.

(10) Patent No.: US 12,560,772 B2
(45) Date of Patent: Feb. 24, 2026

(54) OPTICAL CAGE ASSEMBLY, OPTICAL MODULE CONNECTOR, AND METHOD FOR MANUFACTURING OPTICAL CAGE ASSEMBLY

(71) Applicant: HUAWEI TECHNOLOGIES CO., LTD., Guangdong (CN)

(72) Inventors: Xiaorui Liu, Shenzhen (CN); Chaojun Deng, Dongguan (CN); Chunrong Li, Dongguan (CN); Xiaoyu Tang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 370 days.

(21) Appl. No.: 18/302,011

(22) Filed: Apr. 18, 2023

(65) Prior Publication Data

US 2023/0258890 A1      Aug. 17, 2023

Related U.S. Application Data

(63) Continuation of application No. PCT/CN2021/131912, filed on Nov. 19, 2021.

(30) Foreign Application Priority Data

Dec. 29, 2020   (CN) .......................... 202011591349.9

(51) Int. Cl.
| | |
|---|---|
| *G02B 6/42* | (2006.01) |
| *H01R 13/506* | (2006.01) |
| *H01R 43/18* | (2006.01) |

(52) U.S. Cl.
CPC ......... *G02B 6/4269* (2013.01); *G02B 6/4284* (2013.01); *H01R 13/506* (2013.01); *H01R 43/18* (2013.01)

(58) Field of Classification Search
CPC .. H01R 13/506; H01R 13/533; H01R 13/648; H01R 43/18; G02B 6/4269
See application file for complete search history.

(56) References Cited

U.S. PATENT DOCUMENTS

| | | | | |
|---|---|---|---|---|
| 2019/0246488 A1* | 8/2019 | Kuklinski | ............ | H05K 1/0203 |
| 2020/0163249 A1* | 5/2020 | So | ...................... | H05K 7/20727 |

(Continued)

FOREIGN PATENT DOCUMENTS

| | | |
|---|---|---|
| CN | 106572617 A | 4/2017 |
| CN | 110488433 A | 11/2019 |
| DE | 202020102450 U1 | 7/2020 |

*Primary Examiner* — Oscar C Jimenez

(57) ABSTRACT

An optical cage assembly includes a box-like housing, a radiator, and a cover-like fastener. The box-like housing has a slot. A first housing wall of the box-like housing has an opening at a position close to a slot opening of the slot. The radiator is located at the opening and can be bonded to an electrical connector plugged into the slot. The cover-like fastener is fastened to housing walls of the box-like housing, and the cover-like fastener has a memory alloy member, where the memory alloy member is located on a surface that is of the radiator and that is away from the opening. In this disclosure, easy plugging and unplugging of an optical module in the slot can be implemented, heat transfer between the radiator and the optical module can be accelerated, and an effect of heat dissipation for the optical module can be enhanced.

11 Claims, 5 Drawing Sheets

(a)

(b)

(56)                    References Cited

U.S. PATENT DOCUMENTS

2022/0053669 A1*   2/2022   Gupta ........................ G06F 1/20
2022/0190506 A1*   6/2022   Yang ......................... F16B 2/18
2025/0138263 A1*   5/2025   Saturley .............. G02B 6/4278

* cited by examiner

OPTICAL CAGE ASSEMBLY, OPTICAL MODULE CONNECTOR, AND METHOD FOR MANUFACTURING OPTICAL CAGE ASSEMBLY

CROSS-REFERENCE TO RELATED APPLICATIONS

This application is a continuation of International Application No. PCT/CN2021/131912, filed on Nov. 19, 2021, which claims priority to Chinese Patent Application No. 202011591349.9, filed on Dec. 29, 2020. The disclosures of the aforementioned applications are hereby incorporated by reference in their entireties.

TECHNICAL FIELD

This disclosure relates to the field of optical module heat dissipation technologies, and in particular, to an optical cage assembly, an optical module connector, and a method for manufacturing an optical cage assembly.

BACKGROUND

An optical cage is a housing of an interface component of an optical communications device and has a slot. The slot is configured to plug an electrical connector of an optical module, so that the optical module is connected to a connector in the optical cage.

Considering plugging and unplugging of the electrical connector of the optical module that are in the slot, there is a specific gap between the slot and the electrical connector that is of the optical module and that is plugged into the slot, to facilitate plugging and unplugging.

To dissipate heat of the optical module, a radiator is installed on an outer surface of a slot wall of the slot, to absorb heat generated by the optical module. However, existence of the gap reduces a degree of bonding between the optical module and the radiator, and reduces a speed of heat transfer between the optical module and the radiator. This causes a poor effect of heat dissipation for the optical module.

SUMMARY

This disclosure provides an optical cage assembly, an optical module connector, and a method for manufacturing an optical cage assembly, to overcome a problem in a related technology. Technical solutions are as follows:

According to an aspect, an optical cage assembly is provided. The optical cage assembly includes a box-like housing, a radiator, and a cover-like fastener. The box-like housing has a slot, where the slot is a slot-like structure formed by housing walls of the box-like housing, and the slot is configured to plug an electrical connector of an optical module. A first housing wall of the box-like housing has an opening at a position close to a slot opening of the slot, where the first housing wall is a housing wall close to the slot opening of the slot. The radiator is located at the opening, and can be bonded to the electrical connector plugged into the slot. The cover-like fastener is fastened to the housing walls of the box-like housing, and the cover-like fastener has a memory alloy member. The memory alloy member is located on a surface that is of the radiator and that is away from the opening, and the memory alloy member is configured to: when a temperature is higher than a temperature threshold, enable the radiator to be tightly bonded to the electrical connector located in the slot; and when the temperature is lower than the temperature threshold, enable a gap to exist between the radiator and the electrical connector located in the slot.

The temperature threshold is related to an operating temperature of the optical module. For example, the temperature threshold is relatively close to the operating temperature of the optical module. For example, the temperature threshold is slightly less than the operating temperature of the optical module.

In this way, when no optical module is plugged into the slot, the temperature is lower than the temperature threshold. A shape of the memory alloy member of the cover-like fastener is restored to a second shape, the memory alloy member is in a compressed state, and pressure applied by the memory alloy member to the radiator is relatively small. This helps plug the electrical connector of the optical module into the slot.

After the electrical connector of the optical module is plugged into the slot and the optical module is in an operating state, the optical module generates heat during operation, and the temperature increases. When the temperature is higher than the temperature threshold, the memory alloy member is restored to a first shape, the memory alloy member is in an extended state, and pressure applied by the memory alloy member to the radiator is relatively large, so that a bottom of the radiator can be tightly bonded to the electrical connector in the slot, to accelerate heat transfer between the electrical connector and the radiator.

However, when the optical module needs to be unplugged, the optical module may be first controlled to stop operating. After the optical module stops operating for a period of time, the temperature can decrease to a temperature lower than the temperature threshold. The shape of the memory alloy member is restored to the second shape, the memory alloy member is in a compressed state, and pressure applied by the memory alloy member to the radiator is relatively small. This helps unplug the optical module from the slot.

It can be learned that, in the optical cage assembly with the foregoing structure, when the electrical connector of the optical module is plugged and unplugged in the slot, the cover-like fastener is not compressed against the radiator, to facilitate plugging and unplugging of the electrical connector. However, when the electrical connector of the optical module is located in the slot and is in an operating state, the cover-like fastener is compressed against the radiator, to increase a degree of bonding between the electrical connector and the radiator, accelerate heat transfer between the electrical connector and the radiator, and enhance an effect of heat dissipation for the optical module.

In a possible implementation, the cover-like fastener includes two fastened bezels and at least one tight bezel. The memory alloy member is the tight bezel. The tight bezel is connected between the two fastened bezels, and the fastened bezels are fastened to the housing walls of the box-like housing. When the temperature is higher than the temperature threshold, a bending depth of the tight bezel toward the radiator is a first value; and when the temperature is lower than the temperature threshold, the bending depth of the tight bezel toward the radiator is a second value. The first value is greater than zero, and the second value is less than the first value.

In an example, when the cover-like fastener covers the radiator between a cover of the cover-like fastener and the slot, the tight bezel is laterally located on the surface that is of the radiator and that is away from the opening.

When the temperature is higher than the temperature threshold, the tight bezel extends toward a direction close to the radiator. For example, the tight bezel may bend toward the radiator. The bending depth is the first value, and the first value is greater than zero.

When the temperature is lower than the temperature threshold, the tight bezel compresses toward a direction away from the radiator. The bending depth of the tight bezel toward the radiator is the second value, and the second value is less than the first value. For example, the second value may be greater than zero and less than the first value. In this state, the tight bezel also bends toward the radiator. For another example, the second value is zero. In this state, the tight bezel is parallel to the radiator. For another example, the second value may alternatively be less than zero. In this state, the tight bezel bends toward the direction away from the radiator.

In this way, when the temperature is higher than the temperature threshold, the shape of the tight bezel is restored to a shape formed when the tight bezel bends toward the radiator and the bending depth is the first value. In this case, the tight bezel is tightly bonded to the radiator. However, when the temperature changes from "being higher than the temperature threshold" to "being lower than the temperature threshold", the tight bezel is lifted toward the direction away from the radiator. When the temperature is lower than the temperature threshold, the shape of the tight bezel is restored to a shape formed when the bending depth is the second value. In this case, there is a gap between the tight bezel and the radiator.

It can be learned that when the temperature is higher than the temperature threshold, the electrical connector in the slot can be tightly bonded to the radiator, to accelerate heat transfer between the electrical connector and the radiator, and accelerate heat dissipation for the optical module. When the temperature is lower than the temperature threshold, there is a gap between the electrical connector in the slot and the radiator. A user can easily plug the electrical connector of the optical module into the slot, and the user can easily unplug the electrical connector located in the slot, so that the user easily plugs and unplugs the optical module in the slot.

In a possible implementation, the cover-like fastener includes a fastened cover and at least one helical member. The memory alloy member is the helical member. The fastened cover is fastened to the housing walls of the box-like housing. The helical member is located between the fastened cover and the radiator, and the helical member is perpendicular to the radiator. When the temperature is higher than the temperature threshold, a length of the helical member is a third value; and when the temperature is lower than the temperature threshold, the length of the helical member is a fourth value. The third value is greater than the fourth value.

In an example, when the temperature is higher than the temperature threshold, a shape of the helical member is restored to a shape formed when the length is the third value. In this case, the helical member is in an extended state, and the helical member is tightly bonded to the radiator, so that the radiator is tightly bonded to the electrical connector in the slot. However, when the temperature is lower than the temperature threshold, the shape of the helical member is restored to a shape formed when the length is the fourth value. In this case, the helical member is in a compressed state, so that there is a gap between the radiator and the electrical connector plugged into the slot.

It can be learned that when the temperature is higher than the temperature threshold, the length of the helical member is relatively long. The electrical connector in the slot can be tightly bonded to the radiator, to accelerate heat transfer between the electrical connector and the radiator. When the temperature is lower than the temperature threshold, the length of the helical member is relatively small. A user can easily plug the electrical connector of the optical module into the slot, and the user can easily unplug the electrical connector located in the slot, so that the user easily plugs and unplugs the optical module in the slot.

In addition, compared with a solution in which the memory alloy member is the tight bezel, a solution in which the memory alloy member is the helical member can significantly improve a deformation capability of the memory alloy member. For example, the deformation capability can be improved by 8 to 10 times.

In a possible implementation, one end of the helical member is fastened to an inner surface of the fastened cover, and the other end of the helical member is fastened to the surface that is of the radiator and that is away from the opening.

In an example, one end of the helical member located between the radiator and a cover of the fastened cover is fastened to a surface that is of the radiator and that is away from the slot, and the other end of the helical member is fastened to an inner surface of the cover of the fastened cover. In this way, when the temperature is lower than the temperature threshold, the helical member is in a compressed state, and the helical member can lift the radiator, so that there is a gap between the radiator and the first housing wall. Therefore, a user can easily unplug the electrical connector located in the slot, or easily plug the electrical connector into the slot.

In a possible implementation, the temperature threshold is related to an operating temperature of the optical module plugged into the slot.

The temperature threshold is related to the operating temperature of the optical module. For example, the temperature threshold is relatively close to the operating temperature of the optical module. For example, the temperature threshold is slightly less than the operating temperature of the optical module.

In this way, when no electrical connector of the optical module is plugged into the slot, or when the electrical connector of the optical module that is not in an operating state is plugged into the slot, a temperature in the slot is less than the temperature threshold. However, when the electrical connector of the optical module that is in an operating state is plugged into the slot, a large amount of heat is generated by the optical module in the operating state, so that the temperature in the slot increases to a temperature higher than the temperature threshold.

In a possible implementation, the first housing wall is a housing wall opposite to a fastened housing wall of the box-like housing, and the fastened housing wall is configured to fasten the box-like housing.

As described above, the first housing wall may be any housing wall adjacent to the position of the slot opening of the slot. Any housing wall adjacent to the slot opening of the slot is any housing wall except a second housing wall. The second housing wall is a housing wall opposite to the position of the slot opening of the slot.

For example, the first housing wall may be a housing wall opposite to the fastened housing wall of the box-like housing, and the fastened housing wall is a housing wall configured to fasten the box-like housing. In this solution, a position of the radiator is opposite to a position of the fastened housing wall, to facilitate installation of the optical cage assembly. In addition, a position of the cover-like fastener is opposite to the position of the fastened housing wall, to help buckle two sidewalls that are of the cover-like fastener and the box-like housing and whose positions are opposite to each other.

In a possible implementation, the radiator includes a base and a protrusion. The protrusion is located on a surface of the base. The base covers above the opening. A position of the protrusion is opposite to a position of the opening. The protrusion can extend into the slot, to be tightly bonded to the electrical connector plugged into the slot.

In the radiator with this structure, the base of the radiator is located on an outer surface of the first housing wall, and the protrusion can pass through the opening to extend into the slot, to be in contact with the electrical connector in the slot. This helps installation of the radiator at the opening.

According to another aspect, an optical module connector is provided. The optical module connector includes a connector and the optical cage assembly according to any one of the foregoing aspects. The connector is located in a slot. A position of an electrically connected part of the connector is opposite to a position of a slot opening of the slot. The electrically connected part is configured to be electrically connected to an electrical connector that is of an optical module and that is plugged into the slot. When the optical module in an operating state is plugged into the slot, a temperature of a cover-like fastener is higher than a temperature threshold, and a memory alloy member of the cover-like fastener enables a radiator to be tightly bonded to the electrical connector plugged into the slot. When no optical module or the optical module that is not in an operating state is plugged into the slot, the temperature of the cover-like fastener is lower than the temperature threshold, and the memory alloy member of the cover-like fastener enables a gap to exist between the radiator and the electrical connector plugged into the slot.

For example, when the optical module in an operating state is plugged into the slot, the temperature of the cover-like fastener is higher than the temperature threshold, and a shape of the memory alloy member of the cover-like fastener is restored to a first shape, to increase pressure applied by the cover-like fastener to the radiator, so that the radiator is tightly bonded to the electrical connector plugged into the slot. When no optical module or the optical module that is not in an operating state is plugged into the slot, the temperature of the cover-like fastener is lower than the temperature threshold, and a shape of the memory alloy member is restored to a second shape, to reduce pressure applied by the cover-like fastener to the radiator and reduce plugging and unplugging force applied to the electrical connector of the optical module in the slot.

It can be learned that, in the optical cage assembly with the foregoing structure, when the electrical connector of the optical module is plugged and unplugged, the cover-like fastener is not compressed against the radiator, to facilitate plugging and unplugging of the electrical connector. However, when the electrical connector of the optical module is located in the slot and is in an operating state, the cover-like fastener is compressed against the radiator, to increase a degree of bonding between the electrical connector and the radiator, accelerate heat transfer between the electrical connector and the radiator, and enhance an effect of heat dissipation for the optical module.

According to another aspect, an optical communications device is provided. The optical communications device may include the foregoing optical module connector. As described above, in the optical cage assembly of the optical module connector, when the electrical connector of the optical module is plugged and unplugged, the cover-like fastener is not compressed against the radiator, to facilitate plugging and unplugging of the electrical connector. However, when the electrical connector of the optical module is located in the slot and is in an operating state, the cover-like fastener is compressed against the radiator, to increase a degree of bonding between the electrical connector and the radiator, accelerate heat transfer between the electrical connector and the radiator, and enhance an effect of heat dissipation for the optical module. Therefore, the optical cage assembly can not only implement easy plugging and unplugging of the optical module in the slot, but also accelerate heat transfer between the radiator and the optical module, and enhance an effect of heat dissipation for the optical module.

According to another aspect, a method for manufacturing an optical cage assembly is provided, including the following.

First, a radiator is placed at an opening of a box-like housing.

The opening is located at a position that is of a first housing wall of the box-like housing and that is close to a slot opening of a slot, and the first housing wall is a housing wall close to the slot opening of the slot.

Then, a cover-like fastener is fastened to housing walls of the box-like housing.

The cover-like fastener has a memory alloy member, the memory alloy member is located on a surface that is of the radiator and that is away from the opening, and the memory alloy member is configured to: when a temperature is higher than a temperature threshold, enable the radiator to be tightly bonded to an electrical connector located in the slot; and when the temperature is lower than the temperature threshold, enable a gap to exist between the radiator and the electrical connector located in the slot.

In the manufactured optical cage assembly, when no optical module is plugged into the slot, the temperature is lower than the temperature threshold. A shape of the memory alloy member of the cover-like fastener is restored to a second shape, and pressure applied to the radiator is relatively small. This helps plug the electrical connector of the optical module.

After the electrical connector of the optical module is plugged into the slot and the optical module is in an operating state, the optical module generates heat during operation, and the temperature increases. When the temperature is higher than the temperature threshold, the memory alloy member is restored to a first shape, and applies relatively large pressure to the radiator, so that a bottom of the radiator can be tightly bonded to the electrical connector in the slot, to accelerate heat transfer between the electrical connector and the radiator.

However, when the optical module needs to be unplugged, the optical module may be first controlled to stop operating. After the optical module stops operating for a period of time, the temperature can decrease to a temperature lower than the temperature threshold. The shape of the memory alloy member is restored to the second shape, and pressure applied to the radiator is relatively small. This helps unplug the optical module from the slot.

It can be learned that, in the optical cage assembly with the foregoing structure, when the electrical connector of the optical module is plugged and unplugged, the cover-like fastener is not compressed against the radiator, to facilitate plugging and unplugging of the electrical connector. However, when the electrical connector of the optical module is located in the slot and is in an operating state, the cover-like fastener is compressed against the radiator, to increase a degree of bonding between the electrical connector and the radiator, accelerate heat transfer between the electrical connector and the radiator, and enhance an effect of heat dissipation for the optical module.

In a possible implementation, the cover-like fastener includes two fastened bezels and at least one tight bezel. The memory alloy member is the tight bezel. The tight bezel is connected between the two fastened bezels. During manufacture of the optical cage assembly, the fastened bezels may be fastened to the housing walls of the box-like housing.

In the manufactured optical cage assembly, after the electrical connector of the optical module is plugged into the slot and the optical module is in an operating state, the optical module generates heat during operation, and the temperature increases. When the temperature is higher than the temperature threshold, a bending depth of the tight bezel toward the radiator is a first value, so that the radiator is tightly bonded to the electrical connector plugged into the slot, to improve a speed of heat transfer between the radiator and the electrical connector.

However, when the optical module needs to be unplugged, the optical module may be first controlled to stop operating. After the optical module stops operating for a period of time, the temperature can decrease to a temperature lower than the temperature threshold, and the bending depth of the tight bezel toward the radiator is a second value. The first value is greater than zero, and the second value is less than the first value, so that there is a gap between the radiator and the electrical connector plugged into the slot. This helps unplug the electrical connector of the optical module.

When no optical module is plugged into the slot, the temperature is lower than the temperature threshold, and the bending depth of the tight bezel toward the radiator is the second value. The first value is greater than zero, and the second value is less than the first value. Pressure applied by the tight bezel to the radiator is relatively small. This helps plug the electrical connector of the optical module.

In a possible implementation, the cover-like fastener includes a fastened cover and at least one helical member. The memory alloy member is the helical member. In this case, during manufacture of the optical cage assembly, the fastened cover is fastened to the housing walls of the box-like housing. The helical member is located between the fastened cover and the radiator, and the helical member is perpendicular to the radiator.

In the manufactured optical cage assembly, after the electrical connector of the optical module is plugged into the slot and the optical module is in an operating state, the optical module generates heat during operation, and the temperature increases. When the temperature is higher than the temperature threshold, a length of the helical member is a third value, so that the radiator is tightly bonded to the electrical connector plugged into the slot, to improve a speed of heat transfer between the radiator and the electrical connector.

However, when the optical module needs to be unplugged, the optical module may be first controlled to stop operating. After the optical module stops operating for a period of time, the temperature can decrease to a temperature lower than the temperature threshold, and the length of the helical member is a fourth value. The third value is greater than the fourth value, so that there is a gap between the radiator and the electrical connector plugged into the slot. This helps unplug the electrical connector of the optical module.

When no optical module is plugged into the slot, the temperature is lower than the temperature threshold, and the length of the helical member is the fourth value. The third value is greater than the fourth value, and pressure applied by the helical member to the radiator is relatively small. This helps plug the electrical connector of the optical module into the slot.

According to this embodiment of this disclosure, when no electrical connector of the optical module is plugged into the slot of the optical cage assembly, the temperature is lower than the temperature threshold, and the memory alloy member located on a surface that is of the radiator and that is away from the slot applies relatively small pressure to the radiator. This helps plug the electrical connector of the optical module. When the electrical connector of the optical module that is in an operating state is plugged into the slot of the optical cage assembly, the temperature is higher than the temperature threshold, and the memory alloy member located on the surface that is of the radiator and that is away from the slot applies relatively large pressure to the radiator, so that the radiator is tightly bonded to the electrical connector, to improve a speed of heat transfer between the radiator and the electrical connector. When the electrical connector of the optical module that is not in an operating state is plugged into the slot of the optical cage assembly, the temperature is lower than the temperature threshold, and the memory alloy member located on the surface that is of the radiator and that is away from the slot applies relatively small pressure to the radiator, so that there is a gap between the radiator and the electrical connector. This helps unplug the electrical connector of the optical module. Therefore, the optical cage assembly can not only implement easy plugging and unplugging of the optical module in the slot, but also accelerate heat transfer between the radiator and the optical module, and enhance an effect of heat dissipation for the optical module.

LEGEND DESCRIPTION 1. box-like housing; 11. slot; 12. first housing wall; 121. opening; 13. second housing wall; 14. fastened housing wall;
2. radiator; 21. base; 22. protrusion;
3. cover-like fastener; 31. fastened bezel; 32. tight bezel; 33. fastened cover; 34. helical member;
4. optical module; 41. electrical connector; 5. connector; and 51. electrically connected part.

DESCRIPTION OF EMBODIMENTS

Embodiments of this disclosure provide an optical cage assembly. The optical cage assembly is a housing assembly of an optical module connector of an optical communications device. The optical module connector is an interface component configured to connect optical modules, to implement optical communication between optical communications devices. For example, a first optical module is plugged into an optical module connector of a first optical communications device, and a second optical module is plugged into an optical module connector of a second optical communications device. The first optical module is connected to the second optical module by using an optical cable, to implement optical communication between the first optical communications device and the second optical communications device.

Figure 1:
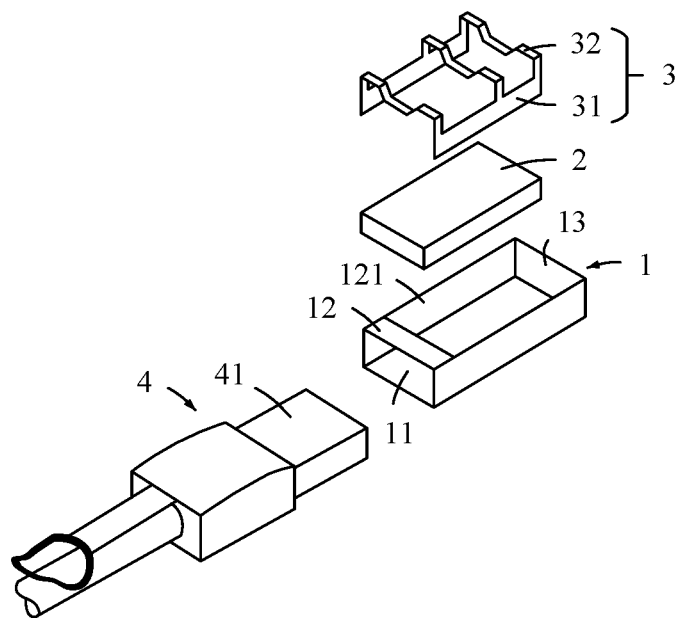
FIG. 1 is a schematic diagram of a structure of an optical cage assembly according to this disclosure.
Figure 2:
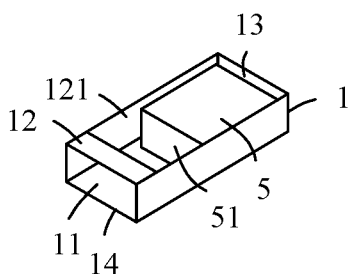
FIG. 2 is a schematic diagram of a structure of a box-like housing of an optical cage assembly according to this disclosure.

The optical module connector further includes a connector 5 configured to be electrically connected to an optical module 4. As shown in FIG. 1, a box-like housing 1 has a slot 11. The slot 11 is a slot-like structure formed by a plurality of housing walls of the box-like housing 1. As shown in FIG. 2, the connector 5 is located in the slot 11, and a position of an electrically connected part 51 of the connector 5 is opposite to a position of a slot opening of the slot 11. As shown in FIG. 2, there is space between the electrically connected part 51 of the connector 5 and the slot opening of the slot 11, and the space is configured to accommodate an electrical connector 41 of the optical module 4. In this way, the electrical connector 41 of the optical module 4 can pass through the slot opening of the slot 11, to be plugged into the slot 11 and connected to the electrically connected part 51 of the connector 5 in the slot 11, so that the optical module 4 is electrically connected to the connector 5 in the box-like housing 1.

The optical module 4 generates a large amount of heat during operation. Therefore, to dissipate the heat of the optical module 4, correspondingly, as shown in FIG. 1, the optical cage assembly further includes a radiator 2. The radiator 2 is installed on an outer surface of the box-like housing 1. To enable the radiator 2 to be in contact with the optical module 4, correspondingly, as shown in FIG. 2, a first housing wall 12 of the box-like housing 1 has an opening 121, and the opening 121 is configured to install the radiator 2. In this way, the radiator 2 is installed at the opening 121, and a bottom of the radiator 2 can pass through the opening

121 to be bonded to the electrical connector 41 located in the slot 11, so that the optical module 4 can be in contact with the radiator 2, to increase a speed of heat transfer.

The first housing wall 12 may be any housing wall adjacent to the position of the slot opening of the slot 11. Any housing wall adjacent to the slot opening of the slot 11 is any housing wall except a second housing wall 13. The second housing wall 13 is a housing wall opposite to the position of the slot opening of the slot 11.

For example, as shown in FIG. 2, the first housing wall 12 may be a housing wall opposite to a fastened housing wall 14 of the box-like housing 1, and the fastened housing wall 14 is a housing wall configured to fasten the box-like housing 1. In this solution, a position of the radiator 2 is opposite to a position of the fastened housing wall 14, to facilitate installation of the optical cage assembly. In addition, a position of a cover-like fastener 3 is opposite to the position of the fastened housing wall 14, to help buckle two sidewalls that are of the cover-like fastener 3 and the box-like housing 1 and whose positions are opposite to each other.

For another example, the first housing wall 12 may alternatively be the fastened housing wall 14. In this solution, a fastened member fastened by the fastened housing wall 14 may also be provided with an opening at a corresponding position of the fastened housing wall 14, so that the radiator 2 successively passes through the opening of the fastened member and the opening of the fastened housing wall 14, to be in contact with the electrical connector 41 in the slot 11. For another example, the first housing wall 12 may alternatively be two sidewalls adjacent to the fastened housing wall 14. A specific housing wall of the box-like housing 1 that is the first housing wall 12 is not limited in this embodiment, and may be flexibly selected based on an actual situation.

For specific disposing of the opening 121 on the first housing wall 12, because the opening 121 enables the bottom of the radiator 2 to pass through the opening 121, to be in contact with the electrical connector 41 plugged into the slot 11, correspondingly, a position of the opening 121 on the first housing wall 12 is a position corresponding to the space between the slot opening of the slot 11 and the electrically connected part 51 of the connector 5. The position is close to the slot opening of the slot 11.

In an example, a length of the opening 121 may match a distance between the slot opening of the slot 11 and the electrically connected part 51 of the connector 5, for example, the length and the distance are equal. The radiator 2 is located at the opening 121. The radiator 2 is in contact with the electrical connector 41 of the optical module 4 plugged into the slot 11, and can absorb heat of the electrical connector 41 of the optical module 4, to dissipate the heat of the optical module 4.

In another example, the length of the opening 121 may alternatively be greater than the distance between the slot opening of the slot 11 and the electrically connected part 51 of the connector 5. The radiator 2 is located at the opening. One part of the radiator 2 is in contact with the electrical connector 41 plugged into the slot 11, and the other part of the radiator 2 is in contact with the connector 5 in the slot 11. The radiator 2 can absorb heat of the electrical connector 41 and the connector 5, to dissipate heat of the optical module 4 plugged into the slot 11 and heat of the connector 5 installed in the slot 11.

Specific disposing of the opening 121 on the first housing wall 12 is not limited in this embodiment, provided that the radiator 2 located at the opening 121 can be bonded to the electrical connector 41 plugged into the slot 11.

In this way, the radiator 2 is located at the opening 121, so that when being plugged into the slot 11, the electrical connector 41 of the optical module 4 can be in contact with the radiator 2 above the slot 11.

Figure 3:
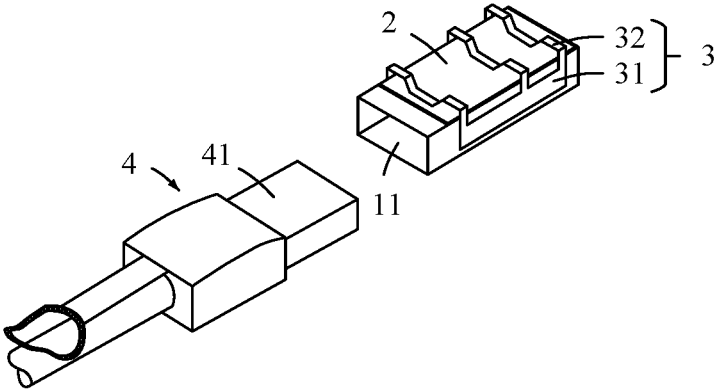
FIG. 3 is a schematic diagram of structures of an optical module and an optical cage assembly according to this disclosure.

To stabilize the radiator 2 at the opening 121, correspondingly, as shown in FIG. 1, the optical cage assembly further includes the cover-like fastener 3. As shown in FIG. 3, the cover-like fastener 3 may cover a surface that is of the radiator 2 and that is away from the opening 121, and is fastened to the housing walls of the box-like housing 1. In this way, the radiator 2 is located between a cover of the cover-like fastener 3 and the slot 11.

As shown in FIG. 3, the cover-like fastener 3 fastens the radiator 2 at the opening 121. If the cover-like fastener 3 applies relatively large force to the radiator 2, the optical module 4 is difficult to be plugged into the slot 11. However, if the cover-like fastener 3 applies relatively small force to the radiator 2, an effect of bonding between the radiator 2 and the electrical connector 41 plugged into the slot 11 is relatively poor. As a result, a rate of heat transfer between the radiator 2 and the electrical connector 41 is slow.

To resolve the foregoing contradiction, correspondingly, the cover-like fastener 3 has a memory alloy member. The memory alloy member is located on the surface that is of the radiator 2 and that is away from the opening 121. When a temperature is higher than a temperature threshold, the memory alloy member enables the radiator 2 to be tightly bonded to the electrical connector 41 located in the slot 11; and when the temperature is lower than the temperature threshold, the memory alloy member enables a gap to exist between the radiator 2 and the electrical connector 41 located in the slot 11.

The memory alloy member is a component made of a memory alloy material having a two-way memory effect. For example, the memory alloy member may be made of at least one of materials in alloys of Au—Cd, Ag—Cd, Cu—Zn, Cu—Zn—Al, Cu—Zn—Sn, Cu—Zn—Si, Cu—Sn, Cu—Zn—Ga, In—Ti, Au—Cu—Zn, Ni—Al, Fe—Pt, Ti—Ni, Zr—Cu, Ni—Mn, Ti—Ni—Pd, Ti—Nb, U—Nb, and Fe—Mn—Si.

The memory alloy member has a memory effect. During processing of the memory alloy member, the memory alloy member is processed into one shape at a temperature higher than the temperature threshold, and the shape may be denoted as a first shape. The memory alloy member is processed into another shape at a temperature lower than the temperature threshold, and the shape may be denoted as a second shape. Once the temperature is higher than the temperature threshold, the memory alloy member can be restored to the first shape, and once the temperature is lower than the temperature threshold, the memory alloy member can be restored to the second shape.

When a shape of the memory alloy member is the first shape, pressure applied by the memory alloy member to the radiator 2 is relatively large, so that the radiator 2 can be tightly bonded to the electrical connector 41 plugged into the slot 11. When the shape of the memory alloy member is the second shape, pressure applied by the memory alloy member to the radiator 2 is relatively small, so that there can be a specific gap between the radiator 2 and the electrical connector 41 plugged into the slot 11.

The temperature threshold is related to an operating temperature of the optical module 4. For example, the temperature threshold is relatively close to the operating temperature of the optical module 4. For example, the temperature threshold is slightly less than the operating temperature of the optical module 4.

In this way, when no optical module 4 is plugged into the slot 11, the temperature is lower than the temperature threshold. The shape of the memory alloy member of the cover-like fastener 3 is restored to the second shape, the memory alloy member is in a compressed state, and pressure applied by the memory alloy member to the radiator 2 is relatively small. This helps plug the electrical connector of the optical module 4 into the slot 11.

After the electrical connector 41 of the optical module 4 is plugged into the slot 11 and the optical module 4 is in an operating state, the optical module 4 generates heat during operation, and the temperature increases. When the temperature is higher than the temperature threshold, the memory alloy member is restored to the first shape, the memory alloy member is in an extended state, and pressure applied by the memory alloy member to the radiator 2 is relatively large, so that the bottom of the radiator 2 can be tightly bonded to the electrical connector 41 in the slot 11, to accelerate heat transfer between the electrical connector 41 and the radiator 2.

However, when the optical module 4 needs to be unplugged, the optical module 4 may be first controlled to stop operating. After the optical module 4 stops operating for a period of time, the temperature can decrease to a temperature lower than the temperature threshold. The shape of the memory alloy member is restored to the second shape, the memory alloy member is in a compressed state, and pressure applied by the memory alloy member to the radiator 2 is relatively small. This helps unplug the optical module 4 from the slot 11.

It can be learned that, in the optical cage assembly with the foregoing structure, when the electrical connector 41 of the optical module 4 is plugged and unplugged, the cover-like fastener 3 is not compressed against the radiator 2, to facilitate plugging and unplugging of the electrical connector 41. However, when the electrical connector 41 of the optical module 4 is located in the slot 11 and is in an operating state, the cover-like fastener 3 is compressed against the radiator 2, to increase a degree of bonding between the electrical connector 41 and the radiator 2, accelerate heat transfer between the electrical connector 41 and the radiator 2, and enhance an effect of heat dissipation for the optical module 4.

The memory alloy member may be laterally located on a surface of the radiator 2, and may increase or reduce, through a bending degree toward a direction close to the radiator 2, pressure applied to the radiator 2. For example, when a bending degree of the memory alloy member toward the direction close to the radiator 2 is relatively large, relatively large pressure can be applied to the radiator 2, so that the radiator 2 is tightly bonded to the electrical connector 41 plugged into the slot 11. For another example, when a bending degree of the memory alloy member toward a direction away from the radiator 2 is relatively small, relatively small pressure or even no pressure is applied to the radiator 2, so that there is a gap between the radiator 2 and the electrical connector 41 plugged into the slot 11.

Alternatively, the memory alloy member may be vertically located on a surface of the radiator 2, and may increase pressure applied to the radiator 2 through stretch, and reduce pressure applied to the radiator 2 through compression. For example, when the memory alloy member is stretched to be relatively long, relatively large pressure can be applied to the radiator 2, so that the radiator 2 is tightly bonded to the electrical connector 41 plugged into the slot 11. For another example, when the memory alloy member is compressed to be relatively short, relatively small pressure or even no pressure is applied to the radiator 2, so that there is a gap between the radiator 2 and the electrical connector 41 plugged into the slot 11.

Alternatively, one part of the memory alloy member may be laterally located on a surface of the radiator 2, and the other part is vertically located on the surface of the radiator 2. Pressure applied to the radiator 2 is adjusted based on a bending degree of the lateral part and a length of the vertical part.

The following provides several examples of the memory alloy member with reference to a specific shape of the cover-like fastener 3.

In an example, the memory alloy member may be a bezel of the cover-like fastener 3. For example, the cover-like fastener 3 may have a structure shown in FIG. 1, and includes two fastened bezels 31 and at least one tight bezel 32. The fastened bezel 31 has a sheet-like structure in terms of shape, and the tight bezel 32 has a linear structure in terms of shape. Two ends of each tight bezel 32 are respectively connected between the two fastened bezels 31, to form the cover-like fastener 3 with a cover-like structure.

The memory alloy member may be the tight bezel 32. When the cover-like fastener 3 covers the radiator 2 between the cover of the cover-like fastener 3 and the slot 11, the tight bezel 32 is laterally located on the surface that is of the radiator 2 and that is away from the opening 121.

Figure 4:
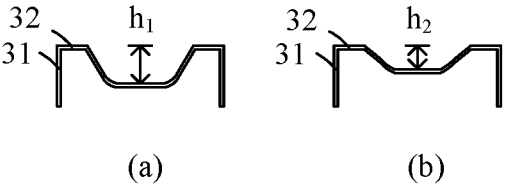
FIG. 4 is a schematic diagram of a structure in which a memory alloy member is a tight bezel according to this disclosure.
Figure 5:
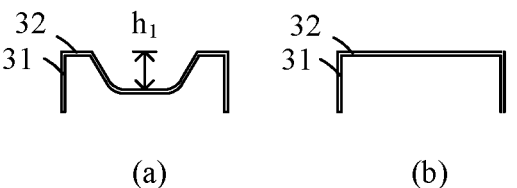
FIG. 5 is a schematic diagram of a structure of a memory alloy member of a cover-like fastener according to this disclosure.

When the temperature is higher than the temperature threshold, the tight bezel 32 extends toward a direction close to the radiator 2. For example, the tight bezel 32 may bend toward the radiator 2. A bending depth is a first value, and the first value is greater than zero. Reference may be made to a schematic diagram of a structure shown in (a) in FIG. 4 and a schematic diagram of a structure shown in (a) in FIG. 5, where $h_1$ in the figure represents the first value.

When the temperature is lower than the temperature threshold, the tight bezel 32 compresses toward a direction away from the radiator 2. The bending depth of the tight bezel 32 toward the radiator 2 is a second value, and the second value is less than the first value. For example, the second value may be greater than zero and less than the first value. In this state, the tight bezel also bends toward the radiator 2, and reference may be made to a schematic diagram of a structure shown in (b) in FIG. 4. For another example, the second value is zero. In this state, the tight bezel 32 is parallel to the radiator 2, and reference may be made to a schematic diagram of a structure shown in (b) in FIG. 5. For another example, the second value may alternatively be less than zero. In this state, the tight bezel 32 bends toward the direction away from the radiator 2, and $h_2$ in the figure represents the second value.

Figure 6:
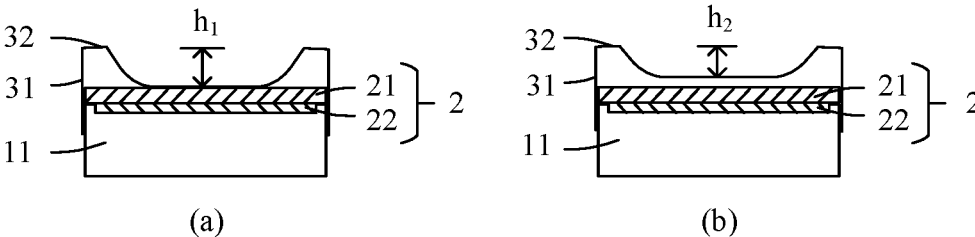
FIG. 6 is a schematic diagram of an assembly structure of a cover-like fastener, a radiator, and a box-like housing according to this disclosure.

In this way, as shown in FIG. 6, when the temperature is higher than the temperature threshold, the shape of the tight bezel 32 is restored to a shape formed when the tight bezel 32 bends toward the radiator 2 and the bending depth is the first value. In this case, the tight bezel 32 is tightly bonded to the radiator 2, and reference may be made to (a) in FIG. 6. However, when the temperature changes from "being higher than the temperature threshold" to "being lower than the temperature threshold", the tight bezel 32 is lifted toward the direction away from the radiator 2. When the temperature is lower than the temperature threshold, the shape of the tight bezel 32 is restored to a shape formed when the bending depth is the second value. In this case, there is a gap between the tight bezel 32 and the radiator 2, and reference may be made to (b) in FIG. 6.

It can be learned that, when the tight bezel 32 is in a state shown in (a) in FIG. 6, the electrical connector 41 in the slot 11 can be tightly bonded to the radiator 2, to accelerate heat transfer between the electrical connector 41 and the radiator 2. When the tight bezel 32 is in a state shown in (b) in FIG. 6, a user can easily plug the electrical connector 41 of the optical module 4 into the slot 11, and the user can easily unplug the electrical connector 41 located in the slot 11, so that the user easily plugs and unplugs the optical module 4 in the slot 11.

A value range of the bending depth $h_1$ in a state in which the tight bezel 32 has the first shape is related to a speed of heat transfer between the radiator 2 and the electrical connector 41 located in the slot 11. The value range of $h_1$ can be determined through a test. Similarly, a value range of the bending depth $h_2$ in a state in which the tight bezel 32 has the second shape is related to plugging/unplugging of the electrical connector 41 in the slot 11. The value range of $h_2$ can be determined through a test.

The foregoing description is about a case in which the memory alloy member is the tight bezel 32 of the cover-like fastener 3.

Figure 7:
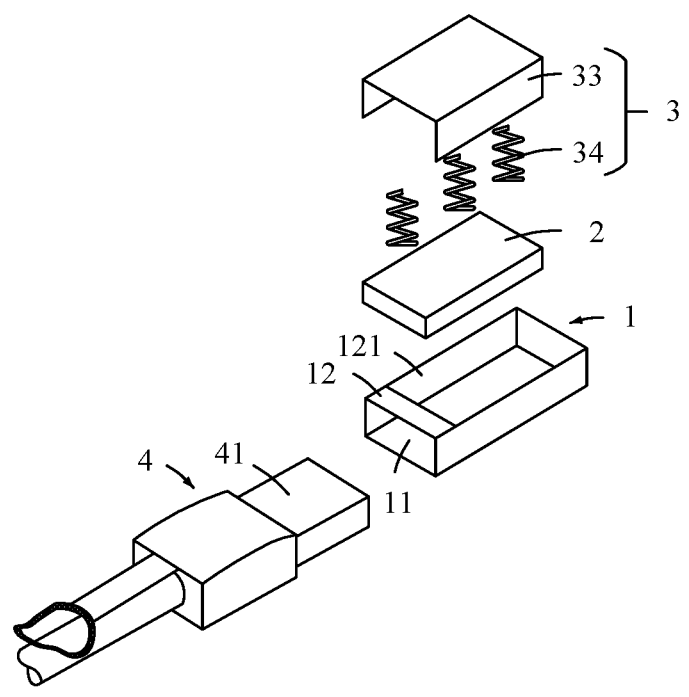
FIG. 7 is a schematic diagram of a structure of an optical cage assembly according to this disclosure.
Figure 8:
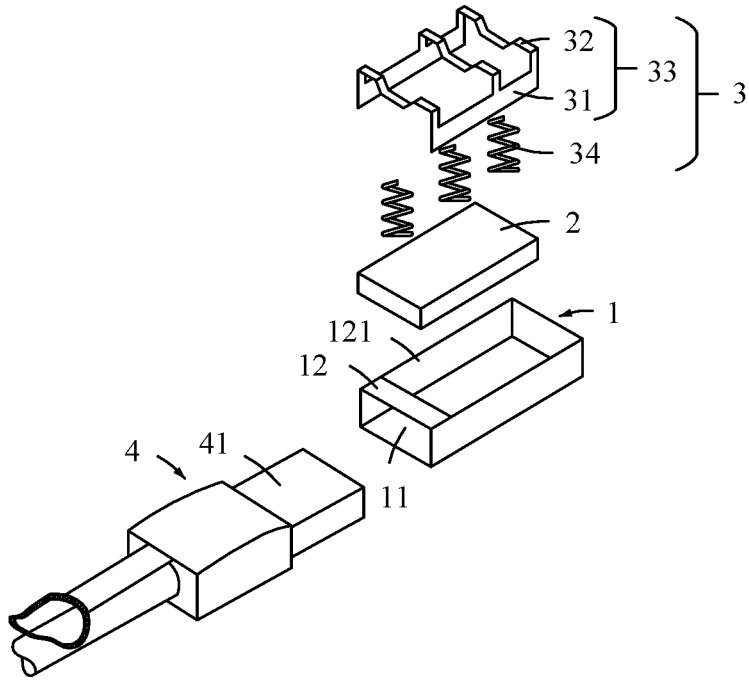
FIG. 8 is a schematic diagram of a structure of an optical cage assembly according to this disclosure.

In another example, the memory alloy member may alternatively be a helical member. Correspondingly, as shown in FIG. 7, the cover-like fastener 3 includes a fastened cover 33 and at least one helical member 34. The fastened cover 33 has a cover-like shape. For example, as shown in FIG. 7, the fastened cover 33 may have a cover-like structure including a sheet-like cover and two sheet-like cover walls. For another example, as shown in FIG. 8, the fastened cover 33 may have a cover-like structure including two fastened bezels 31 and at least one tight bezel 32. A specific shape of the fastened cover 33 is not limited in this embodiment, provided that the fastened cover 33 can cover the housing walls of the box-like housing 1, to be fastened to the housing walls of the box-like housing 1.

Figure 9:
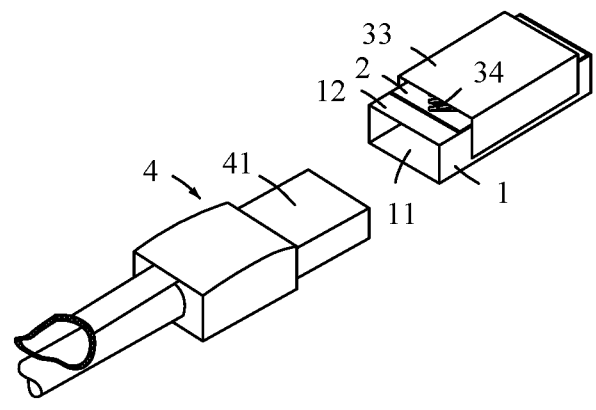
FIG. 9 is a schematic diagram of structures of an optical module and an optical cage assembly according to this disclosure.

The foregoing memory alloy member may be the helical member 34. As shown in FIG. 9, the fastened cover 33 covers the surface that is of the radiator 2 and that is away from the opening 121, and is fastened to the housing walls of the box-like housing 1. The helical member 34 is vertically located between a cover of the fastened cover 33 and the radiator 2. For example, one end of the helical member 34 is located on an inner surface of the cover of the fastened cover 33, and the other end is located on the surface that is of the radiator 2 and that is away from the slot 11.

Figure 10:
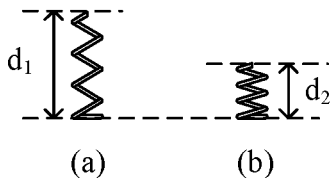
FIG. 10 is a schematic diagram of a structure in which a memory alloy member is a helical member according to this disclosure.

When the temperature is higher than the temperature threshold, a shape of the helical member 34 is the first shape, and the helical member 34 is in an extended state. For example, a length of the helical member 34 is a third value. When the temperature is lower than the temperature threshold, the shape of the helical member 34 is the second shape, and the helical member 34 is in a compressed state. For example, the length of the helical member 34 is a fourth value. The fourth value is less than the third value. For example, as shown in FIG. 10, (a) in FIG. 10 shows the shape of the helical member 34 in an extended state, that is, the shape of the helical member 34 is the first shape, and $d_1$ represents the third value; and (b) in FIG. 10 shows the shape of the helical member 34 in a compressed state, that is, the shape of the helical member 34 is the second shape, and $d_2$ represents the fourth value.

Figure 11:
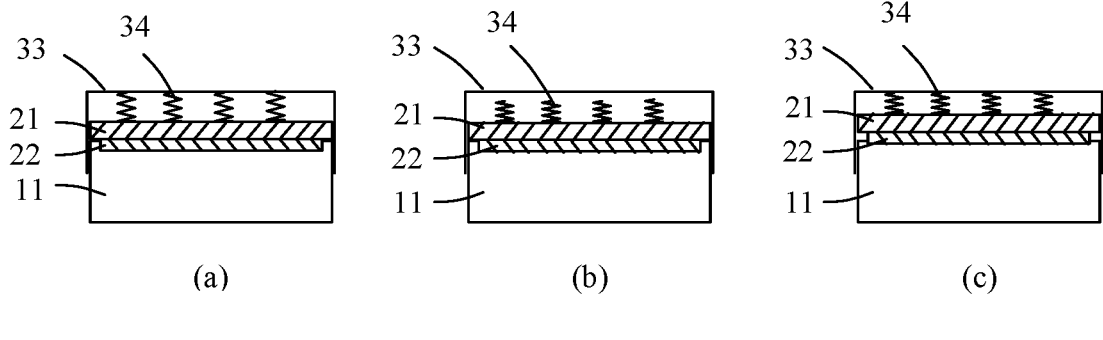
FIG. 11 is a schematic diagram of an assembly structure of a cover-like fastener, a radiator, and a box-like housing according to this disclosure.

In this way, as shown in FIG. 11, when the temperature is higher than the temperature threshold, the shape of the helical member 34 is restored to a shape formed when the length is the third value. In this case, the helical member 34 is in an extended state, and the helical member 34 is tightly bonded to the radiator 2, so that the radiator 2 is tightly bonded to the electrical connector 41 in the slot 11. Reference may be made to (a) in FIG. 11. However, when the temperature is lower than the temperature threshold, the shape of the helical member 34 is restored to a shape formed when the length is the fourth value. In this case, the helical member 34 is in a compressed state, and there is a gap between the helical member 34 and the cover of the fastened cover 33, there is a gap between the helical member 34 and the radiator 2, or there is a gap between the radiator 2 and the first housing wall 12. A specific case is analyzed below.

The helical member 34 located between the radiator 2 and the cover of the fastened cover 33 may be placed vertically between the radiator 2 and the cover of the fastened cover 33. One end of the helical member 34 is not fastened to the surface that is of the radiator 2 and that is away from the slot 11, and the other end is not fastened to the cover of the fastened cover 33, as shown in (b) in FIG. 11. When the helical member 34 is in a compressed state, there is a gap between the helical member 34 and the cover of the fastened cover 33.

Alternatively, one end of the helical member 34 located between the radiator 2 and the cover of the fastened cover 33 may be fastened to the surface that is of the radiator 2 and that is away from the slot 11, and the other end of the helical member 34 is not fastened to the inner surface of the cover of the fastened cover 33, also as shown in (b) in FIG. 11. When the helical member 34 is in a compressed state, there is a gap between the helical member 34 and the cover of the fastened cover 33.

Alternatively, one end of the helical member 34 located between the radiator 2 and the cover of the fastened cover 33 is not fastened to the surface that is of the radiator 2 and that is away from the slot 11, and the other end of the helical member 34 is fastened to the inner surface of the cover of the fastened cover 33, as shown in (c) in FIG. 11. When the helical member 34 is in a compressed state, the helical member 34 can lift the radiator 2, so that there is a gap between the radiator 2 and the first housing wall 12.

Alternatively, one end of the helical member 34 located between the radiator 2 and the cover of the fastened cover 33 is fastened to the surface that is of the radiator 2 and that is away from the slot 11, and the other end of the helical member 34 is fastened to the inner surface of the cover of the fastened cover 33, as shown in (c) in FIG. 11. When the helical member 34 is in a compressed state, the helical member 34 can lift the radiator 2, so that there is a gap between the radiator 2 and the first housing wall 12.

It can be learned that, when the helical member 34 is in a state shown in (a) in FIG. 11, the electrical connector 41 in the slot 11 can be tightly bonded to the radiator 2, to accelerate heat transfer between the electrical connector 41 and the radiator 2. When the helical member 34 is in states shown in (b) and (c) in FIG. 11, a user can easily plug the electrical connector 41 of the optical module 4 into the slot 11, and the user can easily unplug the electrical connector 41 located in the slot 11, so that the user easily plugs and unplugs the optical module 4 in the slot 11.

In addition, compared with a solution in which the memory alloy member is the tight bezel 32, a solution in which the memory alloy member is the helical member 34 can significantly improve a deformation capability of the memory alloy member. For example, the deformation capability can be improved by 8 to 10 times.

A value range of the length $d_1$ in a state in which the helical member 34 has the first shape is related to a speed of heat transfer between the radiator 2 and the electrical connector 41 located in the slot 11. During application, the value range of $d_1$ can be determined through a test. Similarly, a value range of the length $d_2$ in a state in which the helical member 34 has the second shape is related to plugging/unplugging of the electrical connector 41 in the slot 11. During application, the value range of $d_2$ can be determined through a test.

In another example, when the fastened cover 33 of the cover-like fastener 3 has a structure shown in FIG. 8, the memory alloy member may alternatively be the tight bezel 32 and the helical member 34. One end of the helical member 34 is fastened to an inner surface of the tight bezel 32, and the other end of the helical member 34 may be located on the surface that is of the radiator 2 and that is away from the slot 11, or may be fastened to the surface that is of the radiator 2 and that is away from the slot 11.

In this case, when the memory alloy member has the first shape, both the tight bezel 32 and the helical member 34 are in extended states. For example, the bending depth of the tight bezel 32 is a fifth value, and the length of the helical member 34 is a sixth value. When the memory alloy member has the second shape, both the tight bezel 32 and the helical member 34 are in compressed states. For example, the bending depth of the tight bezel 32 is a seventh value, and the length of the helical member 34 is an eighth value. The seventh value is less than the fifth value, and the eighth value is less than the sixth value. The fifth value may be equal or unequal to the first value, the sixth value may be equal or unequal to the third value, the seventh value may be equal or unequal to the second value, and the eighth value may be equal or unequal to the fourth value. This is not limited in this embodiment, and may be flexibly selected during application based on an actual situation.

This embodiment sets no limitation on whether the memory alloy member is the tight bezel 32, the helical member 34, or the tight bezel 32 and the helical member 34. During application, this may be flexibly selected based on an actual situation.

As described above, the radiator 2 is located at the opening 121. For example, in one case, the bottom of the radiator 2 can pass through the opening 121, and a top of the radiator 2 protrudes from the opening 121. For example, as shown in FIG. 11, the radiator 2 may include a base 21 and a protrusion 22. The protrusion 22 is located on a surface of the base 21. For example, the protrusion 22 is located on an upper surface or a lower surface of the base 21. The base 21 covers above the opening 121. A position of the protrusion 22 is opposite to a position of the opening 121. The protrusion 22 can extend into the slot 11 to be tightly bonded to the electrical connector 41 in the slot 11.

The base 21 may have a heat dissipation fin at a position away from the protrusion 22, to increase a heat dissipation area of the radiator 2, accelerate heat dissipation for the optical module 4, and improve a heat dissipation effect.

For another example, in another case in which the radiator 2 is located at the opening 121, an area of the radiator 2 is less than an area of the opening 121, and the radiator 2 is located in the opening 121 and is supported by the connector 5 located in the box-like housing 1.

For another example, in another case in which the radiator 2 is located at the opening 121, an area of the radiator 2 is less than an area of the opening 121, the radiator 2 can be located in the opening 121, but there is a convex structure on an inner surface of the housing wall of the box-like housing 1. The radiator 2 is supported by the convex structure on the inner surface of the housing wall of the box-like housing 1.

For another example, in another case in which the radiator 2 is located at the opening 121, the radiator 2 is a wedge-shaped structure, the bottom of the radiator 2 can be located in the opening 121, and a top of the radiator 2 protrudes from the opening 121.

A specific installation relationship of the radiator 2 at the opening 121 is not limited in this embodiment. During application, the relationship may be flexibly selected based on an actual situation.

As described above, the cover-like fastener 3 is fastened to the housing walls of the box-like housing 1. Correspondingly, cover walls of the cover-like fastener 3 and the housing walls of the box-like housing 1 may be buckled through a buckle. The cover-like fastener 3 and the box-like housing 1 may be detachably installed, to facilitate installation and detachment of the optical cage assembly.

In this embodiment of this disclosure, when no optical module 4 is plugged into the slot 11, the temperature is lower than the temperature threshold. The shape of the memory alloy member of the cover-like fastener 3 is restored to the second shape, the memory alloy member is in a compressed state, and pressure applied by the memory alloy member to the radiator 2 is relatively small. This helps plug the electrical connector of the optical module 4 into the slot. After the electrical connector 41 of the optical module 4 is plugged into the slot 11 and the optical module 4 is in an operating state, the optical module 4 generates heat during operation, and the temperature increases. When the temperature is higher than the temperature threshold, the memory alloy member is restored to the first shape, the memory alloy member is in an extended state, and pressure applied by the memory alloy member to the radiator 2 is relatively large, so that the bottom of the radiator 2 can be tightly bonded to the electrical connector 41 in the slot 11, to accelerate heat transfer between the electrical connector 41 and the radiator 2. However, when the optical module 4 needs to be unplugged, the optical module 4 may be first controlled to stop operating. After the optical module 4 stops operating for a period of time, the temperature can decrease to a temperature lower than the temperature threshold. The shape of the memory alloy member is restored to the second shape, the memory alloy member is in a compressed state, and pressure applied by the memory alloy member to the radiator 2 is relatively small. This helps unplug the optical module 4 from the slot 11.

It can be learned that, in the optical cage assembly with the foregoing structure, when the electrical connector 41 of the optical module 4 is plugged and unplugged, the cover-like fastener 3 is not compressed against the radiator 2, to facilitate plugging and unplugging of the electrical connector 41. However, when the electrical connector 41 of the optical module 4 is located in the slot 11 and is in an operating state, the cover-like fastener 3 is compressed against the radiator 2, to increase a degree of bonding between the electrical connector 41 and the radiator 2, accelerate heat transfer between the electrical connector 41 and the radiator 2, and enhance an effect of heat dissipation for the optical module 4. Therefore, the optical cage assembly can not only implement easy plugging and unplugging of the optical module in the slot, but also accelerate heat transfer between the radiator and the optical module, and enhance an effect of heat dissipation for the optical module.

Figure 12:
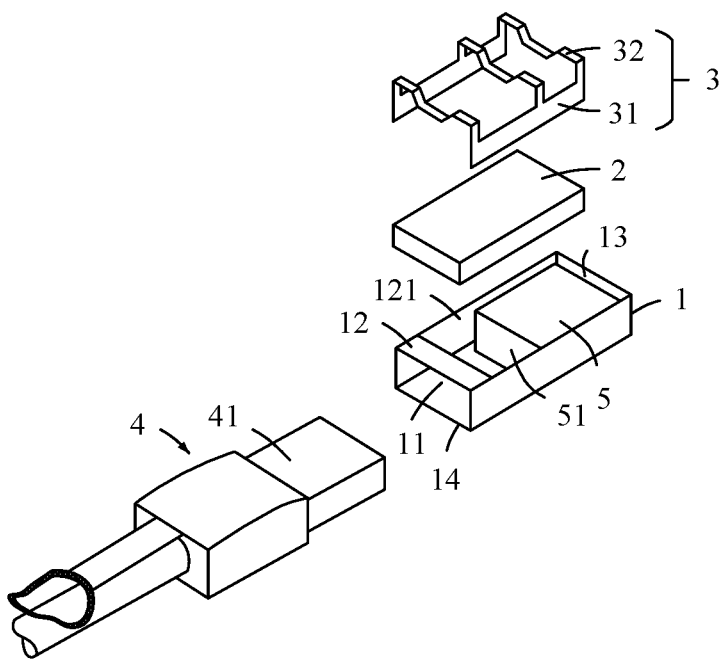
FIG. 12 is a schematic diagram of structures of an optical module and an optical module connector according to this disclosure.

An embodiment further provides an optical module connector. As shown in FIG. 12, the optical module connector includes a connector 5 and the foregoing optical cage assembly. The connector 5 is located in the slot 11 of the box-like housing 1. A position of an electrically connected part 51 of the connector 5 is opposite to a position of a slot opening of the slot 11. Space for accommodating the electrical connector 41 of the optical module 4 exists between the electrically connected part 51 and the slot opening of the slot 11. In this way, the electrical connector 41 of the optical module 4 may pass through the slot opening of the slot 11, to be plugged into the slot 11.

When the optical module 4 in an operating state is plugged into the slot 11, a temperature of the cover-like fastener 3 is higher than a temperature threshold, and a memory alloy member of the cover-like fastener 3 enables the radiator 2 to be tightly bonded to the electrical connector 41 plugged into the slot 11. When no optical module 4 or the optical module 4 that is not in an operating state is plugged into the slot 11, the temperature of the cover-like fastener 3 is lower than the temperature threshold, and the memory alloy member of the cover-like fastener 3 enables a gap to exist between the radiator 2 and the electrical connector 41 plugged into the slot 11.

For example, when the optical module 4 in an operating state is plugged into the slot 11, the temperature of the cover-like fastener 3 is higher than the temperature threshold. A shape of the memory alloy member of the cover-like fastener 3 is restored to a first shape, to increase pressure applied by the cover-like fastener 3 to the radiator 2, so that the radiator 2 is tightly bonded to the electrical connector 41 plugged into the slot 11. When no optical module 4 or the optical module 4 that is not in an operating state is plugged into the slot 11, the temperature of the cover-like fastener 3 is lower than the temperature threshold, and the shape of the cover-like fastener 3 is restored to a second shape, to reduce pressure applied by the cover-like fastener 3 to the radiator 2 and reduce plugging and unplugging force applied to the electrical connector 41 of the optical module 4 in the slot 11.

It can be learned that, in the optical cage assembly with the foregoing structure, when the electrical connector 41 of the optical module 4 is plugged and unplugged, the cover-like fastener 3 is not compressed against the radiator 2, to facilitate plugging and unplugging of the electrical connector 41. However, when the electrical connector 41 of the optical module 4 is located in the slot 11 and is in an operating state, the cover-like fastener 3 is compressed against the radiator 2, to increase a degree of bonding between the electrical connector 41 and the radiator 2, accelerate heat transfer between the electrical connector 41 and the radiator 2, and enhance an effect of heat dissipation for the optical module 4. Therefore, the optical cage assembly can not only implement easy plugging and unplugging of the optical module in the slot, but also accelerate heat transfer between the radiator and the optical module, and enhance an effect of heat dissipation for the optical module.

An embodiment further provides an optical communications device. The optical communications device may include the foregoing optical module connector. As described above, in the optical cage assembly of the optical module connector, when the electrical connector 41 of the optical module 4 is plugged and unplugged, the cover-like fastener 3 is not compressed against the radiator 2, to facilitate plugging and unplugging of the electrical connector 41. However, when the electrical connector 41 of the optical module 4 is located in the slot 11 and is in an operating state, the cover-like fastener 3 is compressed against the radiator 2, to increase a degree of bonding between the electrical connector 41 and the radiator 2, accelerate heat transfer between the electrical connector 41 and the radiator 2, and enhance an effect of heat dissipation for the optical module 4. Therefore, the optical cage assembly can not only implement easy plugging and unplugging of the optical module in the slot, but also accelerate heat transfer between the radiator and the optical module, and enhance an effect of heat dissipation for the optical module.

An embodiment further provides a method for manufacturing an optical cage assembly, where the method is used to manufacture the foregoing optical cage assembly, and the method may include the following process.

First, the radiator 2 is placed at the opening 121 of the box-like housing 1.

The opening 121 is located at a position that is of the first housing wall 12 of the box-like housing 1 and that is close to a slot opening of the slot 11. The first housing wall 12 is a housing wall close to the slot opening of the slot 11.

Then, the cover-like fastener 3 is fastened to housing walls of the box-like housing 1.

For example, the cover-like fastener 3 includes two fastened bezels 31 and at least one tight bezel 32. The tight bezel 32 is connected between the two fastened bezels 31. The two fastened bezels 31 are respectively fastened to two housing walls that are of the box-like housing 1 and whose positions are opposite to each other. The tight bezel 32 is located on a surface that is of the radiator 2 and that is away from the slot 11.

For another example, the cover-like fastener 3 includes a fastened cover 33 and a helical member 34. Two cover walls that are of the fastened cover 33 and whose positions are opposite to each other are respectively fastened to the two housing walls that are of the box-like housing 1 and whose positions are opposite to each other. The helical member 34 is located between a cover of the fastened cover 33 and the radiator 2. One end of the helical member 34 is located on an inner surface of the cover of the fastened cover 33, and the other end is located on the surface that is of the radiator 2 and that is away from the slot 11.

The cover-like fastener 3 has a memory alloy member, where the memory alloy member is located on a surface that is of the radiator 2 and that is away from the opening 121. When a temperature is higher than a temperature threshold, the memory alloy member enables the radiator 2 to be tightly bonded to the electrical connector 41 plugged into the slot 11; and when the temperature is lower than the temperature threshold, the memory alloy member enables a gap to exist between the radiator 2 and the electrical connector 41 plugged into the slot 11.

For example, the memory alloy member may be the tight bezel 32. When the temperature is higher than the temperature threshold, the tight bezel 32 bends toward the radiator 2, and a bending depth is a first value. When the temperature is lower than the temperature threshold, the tight bezel 32 bends toward the radiator 2, and the bending depth is a second value. The second value is less than the first value. Alternatively, when the temperature is lower than the temperature threshold, the tight bezel 32 is parallel to the radiator 2. Alternatively, when the temperature is lower than the temperature threshold, the tight bezel 32 bends toward a direction away from the radiator 2.

For another example, the memory alloy member is the helical member 34. When the temperature is higher than the temperature threshold, the helical member 34 is in an extended state, and a length of the helical member 34 is a third value. When the temperature is lower than the temperature threshold, the helical member 34 is in a compressed state, and the length of the helical member 34 is a fourth value. The fourth value is less than the third value.

For another example, the memory alloy member is the tight bezel 32 and the helical member 34. When the temperature is higher than the temperature threshold, the tight bezel 32 bends toward the radiator 2, and the helical member 34 is in an extended state. When the temperature is lower than the temperature threshold, the tight bezel 32 does not bend toward the radiator 2, and the helical member 34 is in a compressed state. Alternatively, when the temperature is lower than the temperature threshold, the tight bezel 32 slightly bends toward the radiator 2, and the helical member 34 is in a compressed state. Alternatively, when the temperature is lower than the temperature threshold, the tight bezel 32 bends toward the direction away from the radiator 2, and the helical member 34 is in a compressed state.

It can be learned from the foregoing that, in the optical cage assembly with the foregoing structure, when the electrical connector 41 of the optical module 4 is plugged and unplugged, the cover-like fastener 3 is not compressed against the radiator 2, to facilitate plugging and unplugging of the electrical connector 41 in the slot 11. However, when the electrical connector 41 of the optical module 4 is located in the slot 11 and is in an operating state, the cover-like fastener 3 is compressed against the radiator 2, to increase a degree of bonding between the electrical connector 41 and the radiator 2, accelerate heat transfer between the electrical connector 41 and the radiator 2, and enhance an effect of heat dissipation for the optical module 4. Therefore, the optical cage assembly can not only implement easy plugging and unplugging of the optical module in the slot, but also accelerate heat transfer between the radiator and the optical module, and enhance an effect of heat dissipation for the optical module.

The foregoing description is merely embodiments of this disclosure, but is not intended to limit this disclosure. Any modification, equivalent replacement, or improvement made without departing from the spirit and principle of this disclosure should fall within the protection scope of this disclosure.

What is claimed is:

1. An optical cage assembly, comprising a box-like housing, a radiator, and a cover-like fastener, wherein:

the box-like housing has a slot for plugging an electrical connector of an optical module, a first housing wall of the box-like housing is close to a slot opening of the slot and includes an opening at a position close to the slot opening of the slot;

the radiator is located at the opening and is capable of being bonded to the electrical connector plugged into the slot; and the cover-like fastener is fastened to housing walls of the box-like housing and has a memory alloy member, wherein the memory alloy member is located on a surface that is of the radiator and that is away from the opening, and the memory alloy member is configured to:

when a temperature is higher than a temperature threshold related to an operating temperature of the optical module plugged into the slot, enable the radiator to be tightly bonded to the electrical connector located in the slot; and when the temperature is lower than the temperature threshold, enable a gap to exist between the radiator and the electrical connector located in the slot;

wherein the cover-like fastener further comprises a fastened cover fastened to the housing walls of the box-like housing, and the memory alloy member comprises a helical member, the helical member is located between the fastened cover and the radiator and is perpendicular to the radiator, wherein when the temperature is higher than the temperature threshold related to the operating temperature of the optical module plugged into the slot, a length of the helical member is a third value; and when the temperature is lower than the temperature threshold, the length of the helical member is a fourth value, wherein the third value is greater than the fourth value.

2. The optical cage assembly according to claim 1, wherein one end of the helical member is fastened to an inner surface of the fastened cover, and the other end of the helical member is fastened to the surface that is of the radiator and that is away from the opening.

3. The optical cage assembly according to claim 1, wherein the first housing wall is a housing wall opposite to a fastened housing wall of the box-like housing, and the fastened housing wall is configured to fasten the box-like housing.

4. The optical cage assembly according to claim 1, wherein the radiator comprises a base and a protrusion located on a surface of the base; and the base covers above the opening, a position of the protrusion is opposite to a position of the opening, and the protrusion is capable of extending into the slot, to be tightly bonded to the electrical connector plugged into the slot.

5. An optical module connector, comprising a connector and an optical cage assembly; wherein the connector is located in a slot, a position of an electrically connected part of the connector is opposite to a position of a slot opening of the slot, and the electrically connected part is configured to be electrically connected to an electrical connector of an optical module plugged into the slot, and the optical cage assembly comprises a box-like housing, a radiator, and a cover-like fastener;

the box-like housing has a slot for plugging an electrical connector of an optical module, a first housing wall of the box-like housing is close to a slot opening of the slot and includes an opening at a position close to the slot opening of the slot;

the radiator is located at the opening and is capable of being bonded to the electrical connector plugged into the slot; and the cover-like fastener is fastened to housing walls of the box-like housing and has a memory alloy member, wherein the memory alloy member is located on a surface that is of the radiator and that is away from the opening, and the memory alloy member is configured to:

when a temperature is higher than a temperature threshold related to an operating temperature of the optical module plugged into the slot, enable the radiator to be tightly bonded to the electrical connector located in the slot; and when the temperature is lower than the temperature threshold, enable a gap to exist between the radiator and the electrical connector located in the slot;

wherein when the optical module in an operating state is plugged into the slot, a temperature of a cover-like fastener is higher than a temperature threshold; and when no optical module or the optical module that is not in an operating state is plugged into the slot, the temperature of the cover-like fastener is lower than the temperature threshold;

wherein the cover-like fastener further comprises a fastened cover fastened to the housing walls of the box-like housing, and the memory alloy member comprises a helical member, wherein the helical member is located between the fastened cover and the radiator and is perpendicular to the radiator, wherein when the temperature is higher than the temperature threshold related to the operating temperature of the optical module plugged into the slot, a length of the helical member is a third value; and when the temperature is lower than the temperature threshold related to the operating temperature of the optical module plugged into the slot, the length of the helical member is a fourth value, wherein the third value is greater than the fourth value.

6. The optical module connector according to claim 5, wherein one end of the helical member is fastened to an inner surface of the fastened cover, and the other end of the helical member is fastened to the surface that is of the radiator and that is away from the opening.

7. The optical module connector according to claim 5, wherein the first housing wall is a housing wall opposite to a fastened housing wall of the box-like housing, and the fastened housing wall is configured to fasten the box-like housing.

8. The optical module connector according to claim 5, wherein the radiator comprises a base and a protrusion located on a surface of the base; and the base covers above the opening, a position of the protrusion is opposite to a position of the opening, and the protrusion is capable of extending into the slot, to be tightly bonded to the electrical connector plugged into the slot.

9. A method for manufacturing an optical cage assembly, comprising:

placing a radiator at an opening of a box-like housing, wherein the opening is located at a position that is of a first housing wall of the box-like housing and that is close to a slot opening of a slot, and the first housing wall is a housing wall close to the slot opening of the slot; and fastening a cover-like fastener to housing walls of the box-like housing, wherein the cover-like fastener has a memory alloy member, wherein the memory alloy member is located on a surface that is of the radiator and that is away from the opening, and the memory alloy member is configured to:

when a temperature is higher than a temperature threshold related to an operating temperature of the optical module plugged into the slot, enable the radiator to be tightly bonded to an electrical connector located in the slot; and when the temperature is lower than the temperature threshold, enable a gap to exist between the radiator and the electrical connector located in the slot;

wherein the cover-like fastener further comprises a fastened cover, and the memory alloy member comprises a helical member; and the fastening the cover-like fastener to the housing walls of the box-like housing comprises:

fastening the fastened cover to the housing walls of the box-like housing, wherein the helical member is located between the fastened cover and the radiator and is perpendicular to the radiator, wherein when the temperature is higher than the temperature threshold related to the operating temperature of the optical module plugged into the slot, a length of the helical member is a third value; and when the temperature is lower than the temperature threshold related to the operating temperature of the optical module plugged into the slot, the length of the helical member is a fourth value, wherein the third value is greater than the fourth value.

10. The method according to claim 9, wherein one end of the helical member is fastened to an inner surface of the fastened cover, and the other end of the helical member is fastened to the surface that is of the radiator and that is away from the opening.

11. The method according to claim 9, wherein the first housing wall is a housing wall opposite to a fastened housing wall of the box-like housing, and the fastened housing wall is configured to fasten the box-like housing.

\*　\*　\*　\*　\*